United States Patent
Ho (10) Patent No.: US 9,403,267 B2
(45) Date of Patent: Aug. 2, 2016

(54) TELESCOPIC PIPE STRUCTURE FOR POLE SAW

(71) Applicant: K&W Tools Co., Ltd., Nantou, Nantou County (TW)

(72) Inventor: Kung-Jung Ho, Nantou (TW)

(73) Assignee: K&W TOOLS CO., LTD., Nantou, Nantou County (TW)

( * ) Notice: Subject to any disclaimer, the term of this patent is extended or adjusted under 35 U.S.C. 154(b) by 16 days.

(21) Appl. No.: 14/484,825

(22) Filed: Sep. 12, 2014

(65) Prior Publication Data

US 2016/0023347 A1    Jan. 28, 2016

(30) Foreign Application Priority Data

Jul. 22, 2014   (TW) .............................. 103213064 U (51) Int. Cl.
*B25G 1/04*   (2006.01)
*F16B 7/10*   (2006.01)

(52) U.S. Cl.
CPC . *B25G 1/04* (2013.01); *F16B 7/105* (2013.01); *Y10T 16/473* (2015.01)

(58) Field of Classification Search
CPC ......... B25G 1/04; F16B 7/105; Y10T 16/473; B25J 1/04; A01G 3/0255; A01G 3/08; A01G 3/0335; E04H 12/182; A45B 19/04
USPC .............. 16/429; 30/296.1; 294/210; 81/489; 15/144.4; 403/109.3; 135/25.1
See application file for complete search history.

(56) References Cited

U.S. PATENT DOCUMENTS

| 5,287,869 | A * | 2/1994 | Wu ........................ | A45B 19/04 135/25.1 |
| 6,554,012 | B2 * | 4/2003 | Patarra ..................... | A45B 3/00 135/16 |
| 7,574,806 | B2 * | 8/2009 | Wang ....................... | B25G 1/04 16/429 |
| 8,356,548 | B2 * | 1/2013 | Roman .................... | F16K 31/46 15/144.1 |
| 2013/0340266 | A1 * | 12/2013 | Miyawaki .............. | A01G 3/083 30/517 |
| 2014/0000065 | A1 * | 1/2014 | Bukovitz ................. | B25G 3/00 16/429 |
| 2015/0089821 | A1 * | 4/2015 | Troudt .................... | B25G 1/04 30/519 |

FOREIGN PATENT DOCUMENTS

TW           M270782       7/2005

* cited by examiner

*Primary Examiner* — William Miller
(74) *Attorney, Agent, or Firm* — Muncy, Geissler, Olds & Lowe, P.C.

(57) ABSTRACT

A telescopic pipe structure for a pole saw includes an inner pipe, an outer pipe fitted to the inner pipe and moving relative to the inner pipe, and an adjusting device. The adjusting device includes a body, a pressing unit, and an adjusting unit. The outer pipe is penetratingly disposed at a sleeve hole of the body. The pressing unit is pivotally disposed a pressing portion of the body to press against inner pipe and stop movement of the inner pipe. The adjusting unit is disposed at a positioning portion of the body and has a driving element and a positioning element driven by the driving element. The driving element can be at first and second positions, and thus the positioning element moves in one and another directions of the sleeve hole, so as to enable and disable the positioning of the outer and inner pipes, respectively.

12 Claims, 6 Drawing Sheets

TELESCOPIC PIPE STRUCTURE FOR POLE SAW

BACKGROUND OF THE INVENTION

1. Technical Field

The present invention relates to telescopic pipe structures, and more particularly, to a pipe structure adapted for use with a pole saw, comprising an inner pipe and an outer pipe which are coupled together firmly and are capable of adjusting the length of the pipe structure quickly.

2. Description of Related Art

In general, pole trimmers, pole cleaning tools, and pole painting tools are designed to maximize ease of use, for example, by dispensing users with the need to climb a tree in order to trim its branches and the need to bend forward excessively at the waist in order to sweep or mop the floor. To this end, a conventional pole trimmer, pole cleaning tool, or pole painting tool is usually connected to a long pipe for effectuating length extension. Hence, a telescopic structure which comprises an inner pipe and an outer pipe is all the rage today.

Taiwan patent M270782 provides a telescopic pipe structure characterized in that: the front end of an outer pipe is coupled to an outer pipe sleeve; an inner pipe is inserted into a bush; an adjusting knob, a stopping key, a push button sleeve, and a positioning handle are disposed on the outer pipe sleeve; the inner pipe has a plurality of positioning holes; the positioning handle is engaged with and thus stopped at one of the positioning holes of the inner pipe under the control of the adjusting knob and the stopping key; and the positioning handle is covered with a fastening element thereof and thus fixed in place. However, Taiwan patent M270782 has the following drawbacks: the outer pipe sleeve and the push button sleeve cannot be integrally formed, thus resulting in an intricate assembly process, a plethora of constituent components, and increased production costs.

SUMMARY OF THE INVENTION

It is an objective of the present invention to provide a telescopic pipe structure for use with a pole saw, so as to reduce the quantity of the constituent components, simplify the assembly process, and cut production costs.

In order to achieve the above and other objectives, the present invention provides a telescopic pipe structure for a pole saw. The telescopic pipe structure comprises an inner pipe, an outer pipe, and an adjusting device. The outer pipe is fitted to the inner pipe and moves relative to the inner pipe. The adjusting device comprises a body, a pressing unit, and an adjusting unit. The body has a sleeve hole, a pressing portion, and a positioning portion disposed opposite to the pressing portion. A receiving chamber arranged perpendicular, and positioned proximate, to the outer pipe is disposed at the positioning portion. The outer pipe is slidably and penetratingly disposed at the sleeve hole. The pressing unit is pivotally disposed at the pressing portion to press against the inner pipe and stop the inner pipe from moving relative to the outer pipe. The adjusting unit is disposed at the positioning portion and has a driving element, a positioning element, a spring, and a pin. The spring and the driving element are received in the receiving chamber consecutively. The driving element is pushed by the spring to therefore undergo a reverse displacement. The driving element has a through connecting slot and a sloping slot in communication with the connecting slot. The two ends of the sloping slot are defined as a high-level end and a low-level end, respectively. The pin is disposed at the positioning element and moves between the high-level end and the low-level end of the sloping slot. When the driving element protrudes from a first position of the body, the pin is located at the high-level end and causes the positioning element to move in a direction of the sleeve hole, so as to enable the positioning of the outer pipe and the inner pipe. When the driving element protrudes from a second position of the body, the pin is located at the low-level end and causes the positioning element to move in another direction of the sleeve hole, so as to disable the positioning of the outer pipe and the inner pipe.

The pressing unit has a stopping element and a shaft. A handle and a cam are disposed at two ends of the stopping element, respectively. The shaft is penetratingly disposed at the cam and pivotally disposed at the pressing portion.

The outer pipe is penetratingly connected to one end of the body and has an oblong hole positioned proximate to the pressing portion. A press plate is disposed at the pressing portion of the body. The press plate has an end fixedly connected to the body. When pressed on by the cam, another end of the press plate moves toward the sleeve hole and enters the oblong hole to therefore press against the inner pipe.

A protruding portion is disposed at the cam of the stopping element. The handle swings about the shaft. The protruding portion presses on or releases the press plate in accordance with the swing of the handle.

The positioning element has a fixing hole. A through-hole and a via hole, which are perpendicular to each other and in communication with the receiving chamber, are disposed at the positioning portion of the body. The through-hole crosses the outer pipe perpendicularly and is in communication with the sleeve hole. The via hole is parallel to the outer pipe. The inner pipe and the outer pipe have at least a positioning hole, respectively, and the at least a positioning hole is opposite to the through-hole. The connecting slot and the sloping slot of the driving element face the through-hole and the via hole, respectively. The positioning element penetrates the through-hole, the connecting slot, and the positioning holes. The pin penetrates the via hole, the sloping slot, and the fixing hole. When the driving element is at the first position, the pin causes the positioning element to be penetratingly disposed at the positioning holes of the outer pipe and the inner pipe. When the driving element is at the second position, the pin causes the positioning element to separate from the positioning holes of the outer pipe and the inner pipe.

The sleeve hole of the body is defined with a first end portion and a second end portion according to the positions of the outer pipe and the inner pipe. The second end portion extends toward the center of the sleeve hole to form a stabilizing portion. The outer pipe is penetratingly disposed at the sleeve hole and abuts against the stabilizing portion. A stabilizing element is disposed at an end of the inner pipe. The inner pipe is penetratingly disposed at the outer pipe. The outer rim of the stabilizing element abuts against the inner surface of the outer pipe. The outer surface of the inner pipe abuts against the inner rim of the stabilizing portion.

Accordingly, the present invention provides a telescopic pipe structure for use with a pole saw, characterized in that: the body, the pressing portion, and the positioning portion are integrally formed, so as to reduce the quantity of the constituent components, simplify the assembly process, and cut production costs.

The present invention is hereunder illustrated with specific embodiments, drawings, and a detailed description to render the features and advantages of the present invention obvious and comprehensible and allow persons skilled in the art to implement the present invention accordingly. However, persons skilled in the art should understand that the preferred embodiments are illustrative of the present invention only, but should not be interpreted as restrictive of the scope of the present invention. Hence, all simple modifications, replacements, and component reduction made to the aforesaid embodiments without departing from the spirit embodied in the present invention should fall within the scope of the present invention.

BRIEF DESCRIPTION OF THE SEVERAL VIEWS OF THE DRAWINGS

Objectives, features, and advantages of the present invention are hereunder illustrated with specific embodiments in conjunction with the accompanying drawings, in which.

DETAILED DESCRIPTION OF THE EMBODIMENT OF THE INVENTION

To render the features and advantages of the present invention more obvious and comprehensible, the present invention is hereunder illustrated with specific embodiments.

Figure 1:
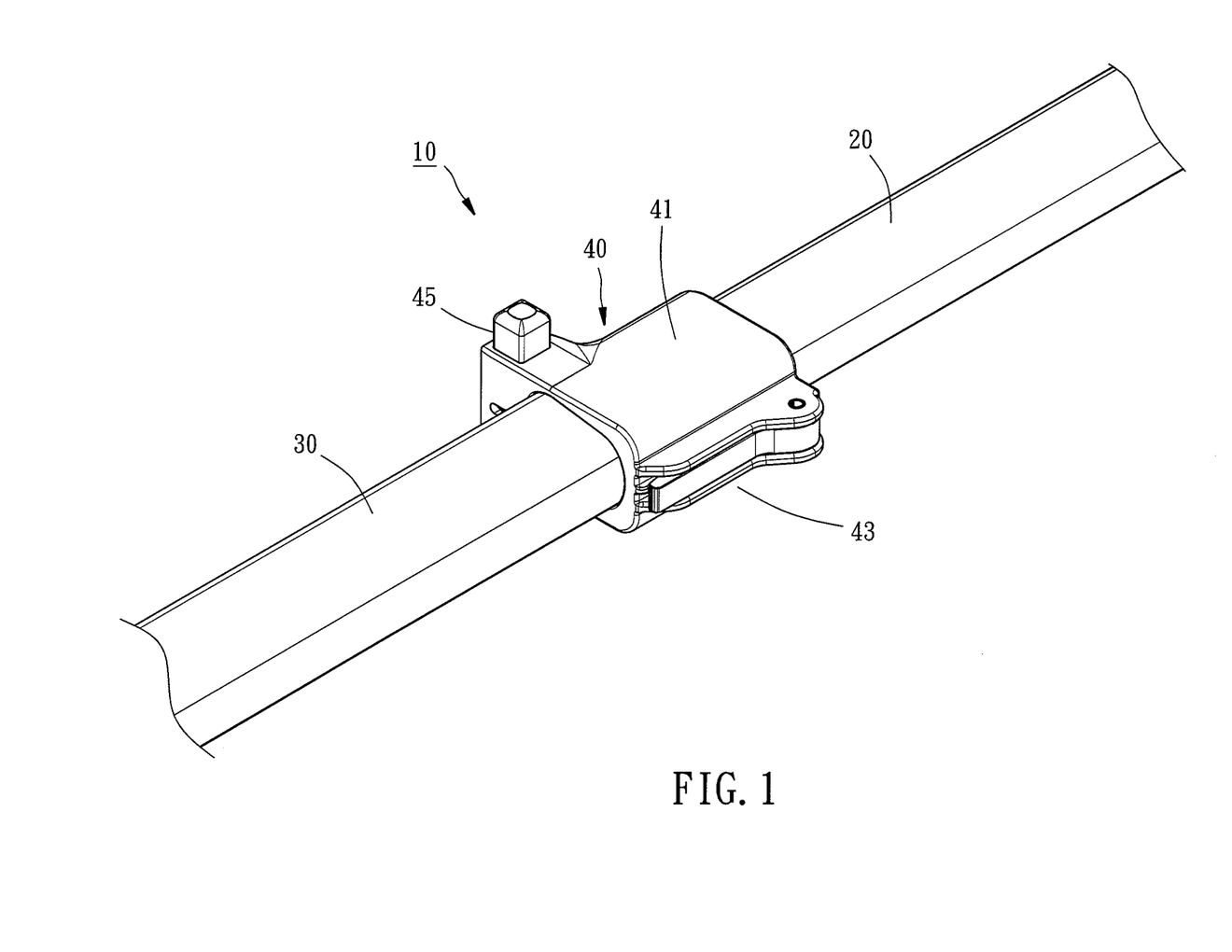
FIG. 1 is a perspective view of a telescopic pipe structure for a pole saw according to a preferred embodiment of the present invention.
Figure 2:
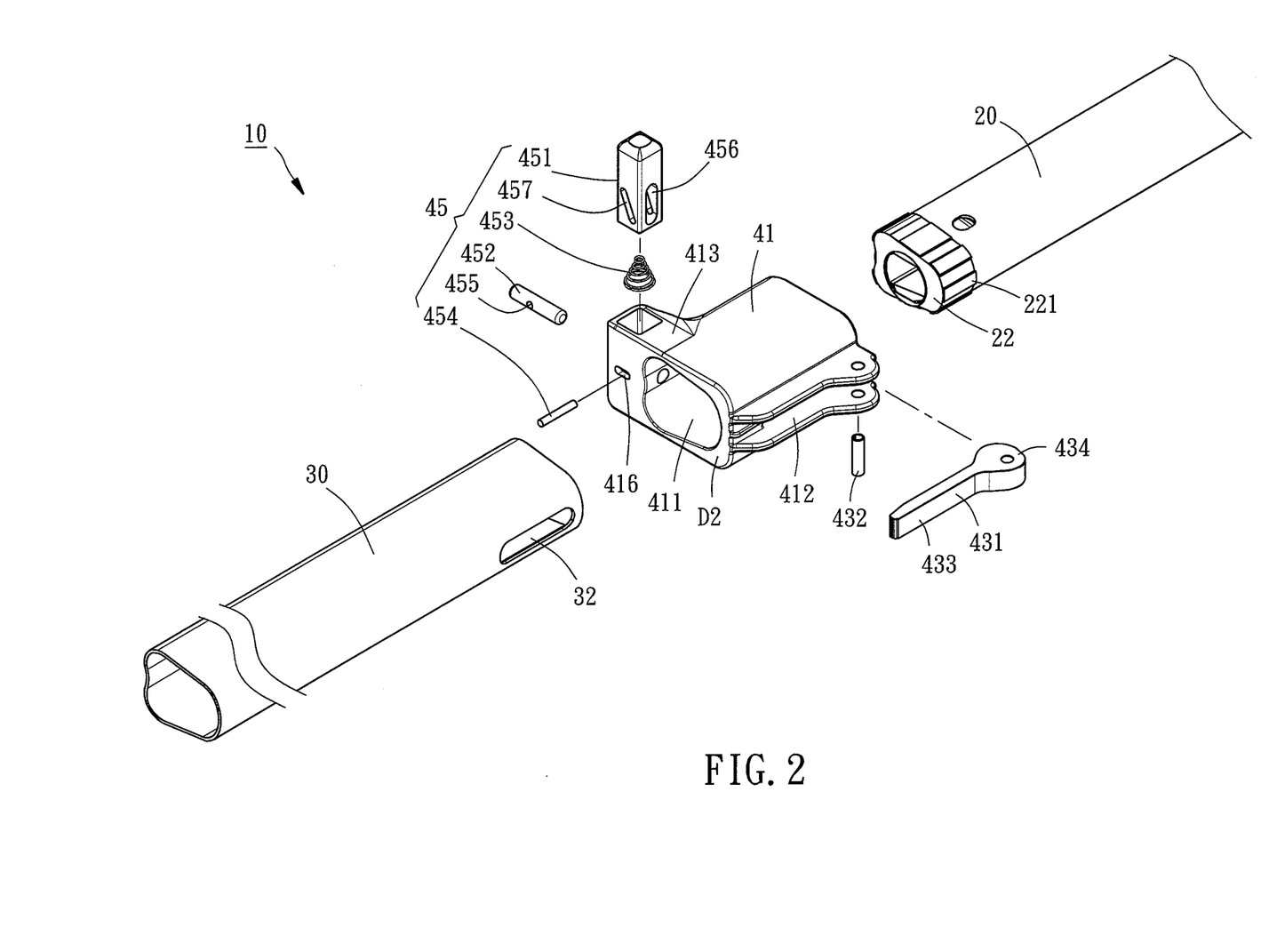
FIG. 2 is an exploded view of the telescopic pipe structure for a pole saw according to the preferred embodiment of the present invention, showing relative positions of the constituent components of the telescopic pipe structure.
Figure 3:
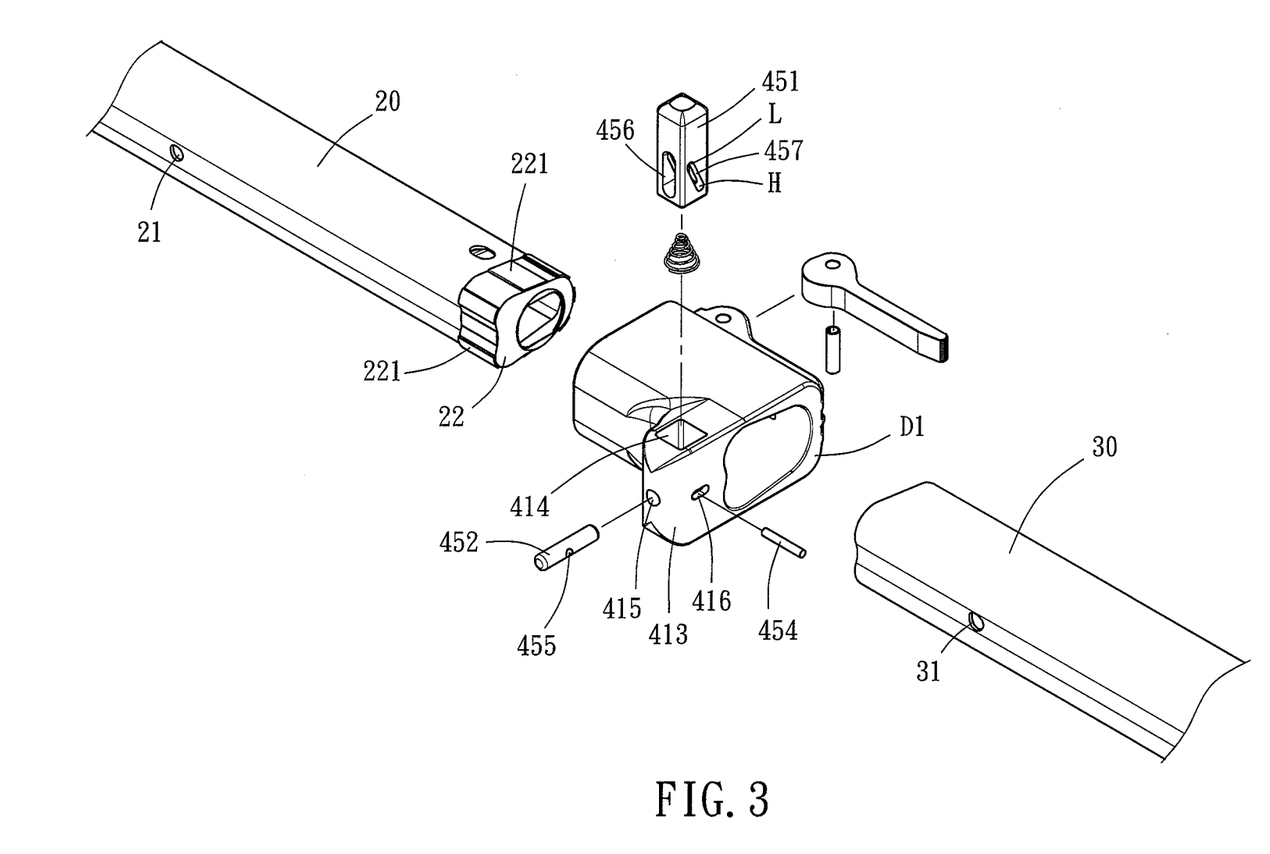
FIG. 3 is an exploded view of the telescopic pipe structure for a pole saw according to the preferred embodiment of the present invention, showing relative positions of the constituent components of the telescopic pipe structure.
Figure 4:
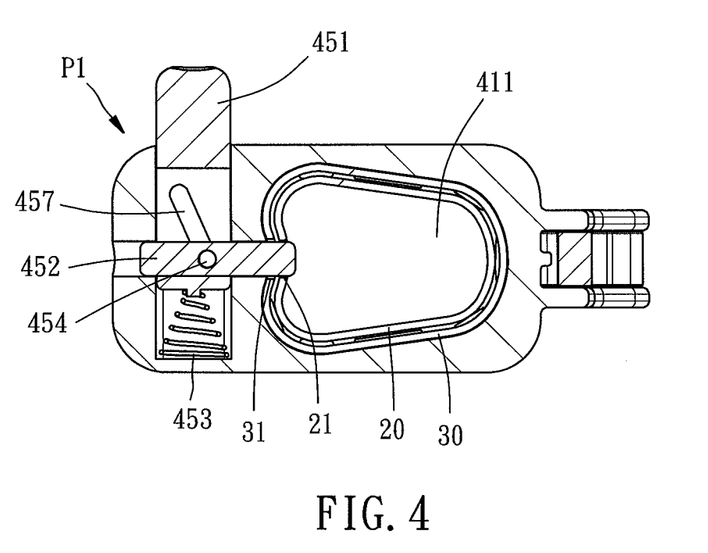
FIG. 4 and FIG. 5 are cross-sectional views of the telescopic pipe structure for a pole saw according to the preferred embodiment of the present invention, showing how a driving element at a first position drives a positioning element and how the driving element at a second position drives the positioning element.
Figure 5:
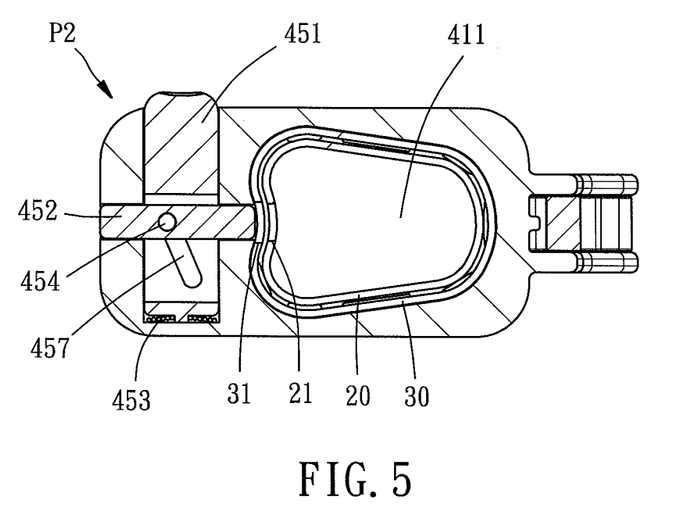

Referring to FIG. 1 through FIG. 3, the present invention provides a telescopic pipe structure 10 for use with a pole saw. The telescopic pipe structure 10 comprises an inner pipe 20, an outer pipe 30, and an adjusting device 40. The outer pipe 30 is fitted to the inner pipe 20 and moves relative to the inner pipe 20. The adjusting device 40 comprises a body 41, a pressing unit 43, and an adjusting unit 45. The body 41 has a sleeve hole 411, a pressing portion 412, and a positioning portion 413 disposed opposite to the pressing portion 412. In the preferred embodiment, the body 41, the pressing unit 43, and the positioning portion 45 are integrally formed, so as to reduce the quantity of the constituent components and simplify the assembly process. The outer pipe 30 slidably penetrates the sleeve hole 411. The pressing unit 43 has a stopping element 431 and a shaft 432. A handle 433 and a cam 434 are disposed at two ends of the stopping element 431, respectively. The shaft 432 is penetratingly disposed at the cam 434 and pivotally disposed at the pressing portion 412 to press against the inner pipe 20 and stop the inner pipe 20 from moving relative to the outer pipe 30. The adjusting unit 45 is disposed at the positioning portion 413 and has a driving element 451 and a positioning element 452 driven by the driving element 451. Referring to FIG. 4 and FIG. 5, when the driving element 451 is at a first position P1, the positioning element 452 moves in a direction of the sleeve hole 411 and enables the positioning of the outer pipe 30 and the inner pipe 20. When the driving element 451 is at a second position P2, the positioning element 452 moves in another direction of the sleeve hole 411 and disables the positioning of the outer pipe 30 and the inner pipe 20. Specifically speaking, the adjusting unit 45 comprises a spring 453 and a pin 454. The positioning element 452 has a fixing hole 455. The driving element 451 has a through connecting slot 456 and a sloping slot 457 in communication with the connecting slot 456. The two ends of the sloping slot 457 are defined as a high-level end H and a low-level end L, respectively. A receiving chamber 414, a through-hole 415, and a via hole 416, which are perpendicular to each other and in communication with each other, are disposed at the positioning portion 413 of the body 41. The through-hole 415 crosses the outer pipe 30 perpendicularly and is in communication with the sleeve hole 411. The via hole 416 is parallel to the outer pipe 30. The inner pipe 20 and the outer pipe 30 have at least a positioning hole 21, 31, respectively, and the at least a positioning hole 21, 31 is opposite to the through-hole 415. The spring 453 and the driving element 451 are received in the receiving chamber 414 consecutively. The driving element 451 is pushed by the spring 453 to therefore undergo a reverse displacement. The connecting slot 456 and the sloping slot 457 of the driving element 451 face the through-hole 415 and the via hole 416, respectively. The positioning element 452 penetrates the through-hole 415, the connecting slot 456, and the positioning holes 21, 31. The pin 454 penetrates the via hole 416, the sloping slot 457, and the fixing hole 455. When the driving element 451 is at the first position P1, the pin 454 is located at the high-level end H of the sloping slot 457 and causes the positioning element 452 to be penetratingly disposed at the positioning hole 31 of the outer pipe 30 and the positioning hole 21 of the inner pipe 20. When the driving element 451 is at the second position P2, the pin 454 is located at the low-level end L of the sloping slot 457 and causes the positioning element 452 to separate from the positioning hole 31 of the outer pipe 30 and the positioning hole 21 of the inner pipe 20. Accordingly, a user can adjust the length of the telescopic pipe structure conveniently and safely.

Figure 6:
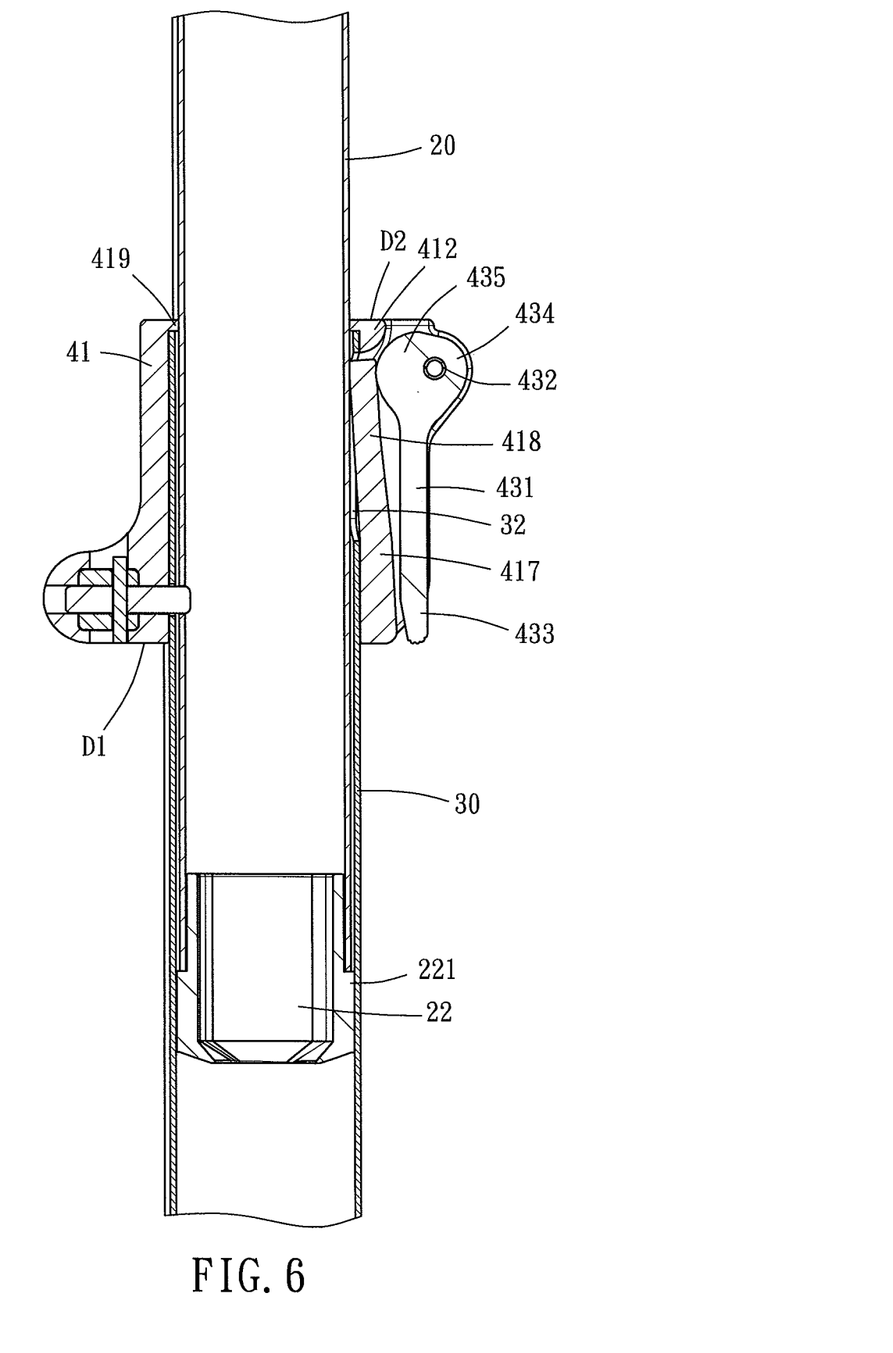
FIG. 6 and FIG. 7 are cross-sectional views of the telescopic pipe structure for a pole saw according to the preferred embodiment of the present invention, showing that a stopping element swings and thus causes a protruding portion of a cam to press on or release a press plate.
Figure 7:
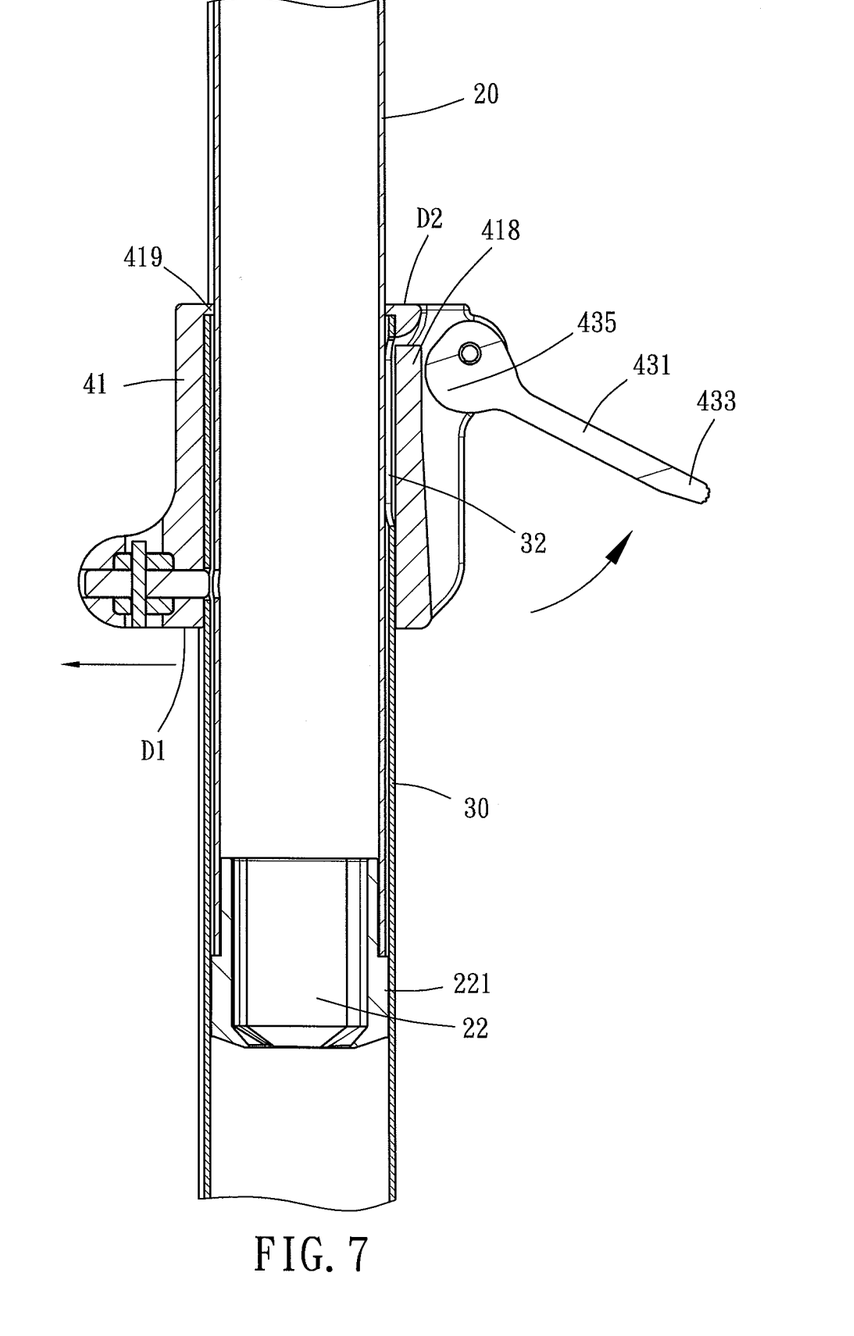

Referring to FIG. 6 and FIG. 7, in the preferred embodiment of the present invention, the outer pipe 30 is penetratingly connected to one end of the body 41 and has an oblong hole 32 positioned proximate to the pressing portion 412. A press plate 417 is disposed at the pressing portion 412 of the body 41. The press plate 417 has one end fixedly connected to the body 41 as well as another end defined as a free end 418 and adapted to swing under an applied force. A protruding portion 435 is disposed at the cam 434 of the stopping element 431. The handle 433 swings about the shaft 432. The protruding portion 435 presses on or releases the free end 418 of the press plate 417 in accordance with the swing of the handle 433. Hence, as soon as the protruding portion 435 of the cam 434 presses on the free end 418 of the press plate 417, the free end 418 of the press plate 417 moves in the direction of the sleeve hole 411 and thus enters the oblong hole 32 to therefore press against the inner pipe 20. The protruding portion 435 of the cam 434 does not abut against the inner pipe 20 directly but presses directly on the free end 418 of the press plate 417, so as to not only reduce the wear and tear of the protruding portion 435 advantageously, but also favorably augment the aforesaid stopping effect by increasing the contact area between the press plate 417 and the inner pipe 20.

To couple the inner pipe 20 and the outer pipe 30 together better and enhance their stability while they are in operation, the present invention is further characterized in that: the sleeve hole 411 of the body 41 is defined with a first end portion D1 and a second end portion D2 according to the positions of the outer pipe 30 and the inner pipe 20; the second end portion D2 extends toward the center of the sleeve hole 411 to form a stabilizing portion 419; the outer pipe is penetratingly disposed at the sleeve hole 411 and abuts against the stabilizing portion 419; a stabilizing element 22 is disposed at an end of the inner pipe 20; the inner pipe 20 is penetratingly disposed at the outer pipe 30; the outer rim of the stabilizing element 22 abuts against the inner surface of the outer pipe 30; and the outer surface of the inner pipe 20 abuts against the inner rim of the stabilizing portion 419. In the preferred embodiment of the present invention, to prevent the stabilizing element 22 from coming into contact with the inner surface of the outer pipe 30 excessively and thus compromising sliding, the present invention is further characterized in that: a plurality of flanges 221 is formed at a circumferential surface of the stabilizing element 22, wherein the inner surface of the outer pipe 30 is in contact with the circumferential surface of the stabilizing element 22, such that the stabilizing element 22 is positioned firmly and operates conveniently.

In conclusion, the present invention provides a telescopic pipe structure 10 for use with a pole saw. The telescopic pipe structure 10 is characterized in that: the inner pipe 20 and the outer pipe 30 are coupled together through the body 41; and the adjusting unit 45 operates in conjunction with the pressing unit 43 to stabilize a positioning structure of the outer pipe 30 and the inner pipe 20. Hence, it is convenient and safe for the user to extend or shorten the telescopic pipe structure. Furthermore, since the body, the pressing portion, and the positioning portion are integrally formed, the present invention not only simplifies constituent elements and the assembly process but also cuts production costs.

The constituent components of the present invention, which are disclosed in the aforesaid embodiment, are illustrative rather than restrictive of the scope of the present invention. Hence, replacements and variations involving any other equivalent elements and made to the present invention must fall within the claims of the present invention.

What is claimed is:

1. A telescopic pipe structure for a pole saw, comprising:
an inner pipe;
an outer pipe fitted to the inner pipe and adapted to move relative to the inner pipe; and
an adjusting device comprising a body, a pressing unit, and an adjusting unit,
wherein the body has a sleeve hole, a pressing portion, and a positioning portion positioned opposite to the pressing portion,
wherein a receiving chamber arranged perpendicular, and positioned proximate, to the outer pipe is disposed at the positioning portion,
wherein the outer pipe is slidably and penetratingly disposed at the sleeve hole,
wherein the pressing unit is pivotally disposed at the pressing portion to press against the inner pipe and stop the inner pipe from moving relative to the outer pipe,
wherein the adjusting unit is disposed at the positioning portion and comprises a driving element, a positioning element, a spring, and a pin,
wherein the spring and the driving element are received in the receiving chamber consecutively,
wherein the driving element is pushed by the spring to therefore undergo a reverse displacement,
wherein the driving element has a through connecting slot and a sloping slot in communication with the connecting slot,
wherein two ends of the sloping slot are defined as a high-level end and a low-level end, respectively,
wherein the pin is disposed at the positioning element and moves between the high-level end and the low-level end of the sloping slot,
wherein, when the driving element protrudes from a first position of the body, the pin is located at the high-level end and causes the positioning element to move in a direction of the sleeve hole, so as to enable the positioning of the outer pipe and the inner pipe, and
wherein, when the driving element protrudes from a second position of the body, the pin is located at the low-level end and causes the positioning element to move in another direction of the sleeve hole, so as to disable the positioning of the outer pipe and the inner pipe.

2. The telescopic pipe structure of claim 1, wherein the positioning element has a fixing hole, wherein a through-hole and a via hole, which are perpendicular to each other and in communication with the receiving chamber, are disposed at the positioning portion of the body, wherein the through-hole crosses the outer pipe perpendicularly and is in communication with the sleeve hole, wherein the via hole is parallel to the outer pipe, wherein the inner pipe and the outer pipe have at least a positioning hole, respectively, and the at least a positioning hole is opposite to the through-hole, wherein the connecting slot and the sloping slot of the driving element face the through-hole and the via hole, respectively, wherein the positioning element penetrates the through-hole, the connecting slot, and the positioning holes, wherein the pin penetrates the via hole, the sloping slot, and the fixing hole, wherein, when the driving element is at the first position, the pin causes the positioning element to be penetratingly disposed at the positioning holes of the outer pipe and the inner pipe, wherein, when the driving element is at the second position, the pin causes the positioning element to separate from the positioning holes of the outer pipe and the inner pipe.

3. The telescopic pipe structure of claim 1, wherein the sleeve hole of the body is defined with a first end portion and a second end portion according to the positions of the outer pipe and the inner pipe, the second end portion extending toward a center of the sleeve hole to form a stabilizing portion, wherein the outer pipe is penetratingly disposed at the sleeve hole and abuts against the stabilizing portion, wherein a stabilizing element is disposed at an end of the inner pipe, wherein the inner pipe is penetratingly disposed at the outer pipe, wherein an outer rim of the stabilizing element abuts against an inner surface of the outer pipe, wherein an outer surface of the inner pipe abuts against an inner rim of the stabilizing portion.

4. The telescopic pipe structure of claim 1, wherein the pressing unit has a stopping element and a shaft, wherein a handle and a cam are disposed at two ends of the stopping element, respectively, wherein the shaft is penetratingly disposed at the cam and pivotally disposed at the pressing portion.

5. The telescopic pipe structure of claim 4, wherein the positioning element has a fixing hole, wherein a through-hole and a via hole, which are perpendicular to each other and in communication with the receiving chamber, are disposed at the positioning portion of the body, wherein the through-hole crosses the outer pipe perpendicularly and is in communication with the sleeve hole, wherein the via hole is parallel to the outer pipe, wherein the inner pipe and the outer pipe have at least a positioning hole, respectively, and the at least a positioning hole is opposite to the through-hole, wherein the connecting slot and the sloping slot of the driving element face the through-hole and the via hole, respectively, wherein the positioning element penetrates the through-hole, the connecting slot, and the positioning holes, wherein the pin penetrates the via hole, the sloping slot, and the fixing hole, wherein, when the driving element is at the first position, the pin causes the positioning element to be penetratingly disposed at the positioning holes of the outer pipe and the inner pipe, wherein, when the driving element is at the second position, the pin causes the positioning element to separate from the positioning holes of the outer pipe and the inner pipe.

6. The telescopic pipe structure of claim 4, wherein the sleeve hole of the body is defined with a first end portion and a second end portion according to the positions of the outer pipe and the inner pipe, the second end portion extending toward a center of the sleeve hole to form a stabilizing portion, wherein the outer pipe is penetratingly disposed at the sleeve hole and abuts against the stabilizing portion, wherein a stabilizing element is disposed at an end of the inner pipe, wherein the inner pipe is penetratingly disposed at the outer pipe, wherein an outer rim of the stabilizing element abuts against an inner surface of the outer pipe, wherein an outer surface of the inner pipe abuts against an inner rim of the stabilizing portion.

7. The telescopic pipe structure of claim 4, wherein the outer pipe is penetratingly connected to an end of the body and has an oblong hole positioned proximate to the pressing portion, wherein a press plate is disposed at the pressing portion of the body, wherein the press plate has an end fixedly connected to the body, wherein, when pressed on by the cam, another end of the press plate moves toward the sleeve hole and enters the oblong hole to therefore press against the inner pipe.

8. The telescopic pipe structure of claim 7, wherein the positioning element has a fixing hole, wherein a through-hole and a via hole, which are perpendicular to each other and in communication with the receiving chamber, are disposed at the positioning portion of the body, wherein the through-hole crosses the outer pipe perpendicularly and is in communication with the sleeve hole, wherein the via hole is parallel to the outer pipe, wherein the inner pipe and the outer pipe have at least a positioning hole, respectively, and the at least a positioning hole is opposite to the through-hole, wherein the connecting slot and the sloping slot of the driving element face the through-hole and the via hole, respectively, wherein the positioning element penetrates the through-hole, the connecting slot, and the positioning holes, wherein the pin penetrates the via hole, the sloping slot, and the fixing hole, wherein, when the driving element is at the first position, the pin causes the positioning element to be penetratingly disposed at the positioning holes of the outer pipe and the inner pipe, wherein, when the driving element is at the second position, the pin causes the positioning element to separate from the positioning holes of the outer pipe and the inner pipe.

9. The telescopic pipe structure of claim 7, wherein the sleeve hole of the body is defined with a first end portion and a second end portion according to the positions of the outer pipe and the inner pipe, the second end portion extending toward a center of the sleeve hole to form a stabilizing portion, wherein the outer pipe is penetratingly disposed at the sleeve hole and abuts against the stabilizing portion, wherein a stabilizing element is disposed at an end of the inner pipe, wherein the inner pipe is penetratingly disposed at the outer pipe, wherein an outer rim of the stabilizing element abuts against an inner surface of the outer pipe, wherein an outer surface of the inner pipe abuts against an inner rim of the stabilizing portion.

10. The telescopic pipe structure of claim 7, wherein a protruding portion is disposed at the cam of the stopping element, wherein the handle swings about the shaft, wherein the protruding portion presses on or releases the press plate in accordance with the swing of the handle.

11. The telescopic pipe structure of claim 10, wherein the positioning element has a fixing hole, wherein a through-hole and a via hole, which are perpendicular to each other and in communication with the receiving chamber, are disposed at the positioning portion of the body, wherein the through-hole crosses the outer pipe perpendicularly and is in communication with the sleeve hole, wherein the via hole is parallel to the outer pipe, wherein the inner pipe and the outer pipe have at least a positioning hole, respectively, and the at least a positioning hole is opposite to the through-hole, wherein the connecting slot and the sloping slot of the driving element face the through-hole and the via hole, respectively, wherein the positioning element penetrates the through-hole, the connecting slot, and the positioning holes, wherein the pin penetrates the via hole, the sloping slot, and the fixing hole, wherein, when the driving element is at the first position, the pin causes the positioning element to be penetratingly disposed at the positioning holes of the outer pipe and the inner pipe, wherein, when the driving element is at the second position, the pin causes the positioning element to separate from the positioning holes of the outer pipe and the inner pipe.

12. The telescopic pipe structure of claim 10, wherein the sleeve hole of the body is defined with a first end portion and a second end portion according to the positions of the outer pipe and the inner pipe, the second end portion extending toward a center of the sleeve hole to form a stabilizing portion, wherein the outer pipe is penetratingly disposed at the sleeve hole and abuts against the stabilizing portion, wherein a stabilizing element is disposed at an end of the inner pipe, wherein the inner pipe is penetratingly disposed at the outer pipe, wherein an outer rim of the stabilizing element abuts against an inner surface of the outer pipe, wherein an outer surface of the inner pipe abuts against an inner rim of the stabilizing portion.

\* \* \* \* \*